(12) United States Patent
Swinscoe

(10) Patent No.: US 9,085,876 B2
(45) Date of Patent: Jul. 21, 2015

(54) LOCK FOR AN EXCAVATOR WEAR ASSEMBLY

(75) Inventor: Michael Swinscoe, Mackay (AU)

(73) Assignee: CQMS PTY LTD, Queensland (AU)

( * ) Notice: Subject to any disclaimer, the term of this patent is extended or adjusted under 35 U.S.C. 154(b) by 786 days.

(21) Appl. No.: 13/133,067

(22) PCT Filed: Sep. 10, 2009

(86) PCT No.: PCT/AU2009/001194
§ 371 (c)(1),
(2), (4) Date: Sep. 9, 2011

(87) PCT Pub. No.: WO2010/065982
PCT Pub. Date: Jun. 17, 2010

(65) Prior Publication Data
US 2011/0314709 A1 Dec. 29, 2011

(30) Foreign Application Priority Data
Dec. 10, 2008 (AU) ................................ 2008906380

(51) Int. Cl.
*E02F 9/28* (2006.01)
*F16B 19/02* (2006.01)
*F16B 37/00* (2006.01)

(52) U.S. Cl.
CPC ............... *E02F 9/2833* (2013.01); *F16B 19/02* (2013.01); *F16B 37/00* (2013.01); *Y10T 403/7075* (2015.01)

(58) Field of Classification Search
USPC .................................................... 37/455, 456
See application file for complete search history.

(56) References Cited

U.S. PATENT DOCUMENTS

| 612,489 | A | * | 10/1898 | Dean ............................. 403/370 |
| 2,709,941 | A | | 6/1955 | Larsen |
| 4,413,432 | A | * | 11/1983 | Bierwith ......................... 37/456 |
| 5,410,826 | A | | 5/1995 | Immel et al. |
| 5,638,621 | A | | 6/1997 | Keech et al. |
| 7,313,877 | B2 | * | 1/2008 | Clendenning et al. .......... 37/456 |
| 7,681,341 | B2 | * | 3/2010 | Ruvang ............................ 37/456 |
| D614,476 | S | * | 4/2010 | Buhse ............................ D8/343 |
| D634,605 | S | * | 3/2011 | Guimaraes ..................... D8/343 |
| 8,458,931 | B2 | * | 6/2013 | Knight ............................. 37/456 |
| 8,468,725 | B2 | * | 6/2013 | Leslie et al. ..................... 37/456 |
| 2003/0140531 | A1 | | 7/2003 | Pippins |
| 2004/0244236 | A1 | | 12/2004 | Mautino |
| 2006/0059732 | A1 | * | 3/2006 | Clendenning et al. .......... 37/456 |

OTHER PUBLICATIONS

International Search Report received in corresponding PCT Application No. PCT/AU2009/001194 mail date Oct. 29, 2009.

* cited by examiner

*Primary Examiner* — Jamie L McGowan
(74) *Attorney, Agent, or Firm* — Blank Rome LLP

(57) ABSTRACT

A lock for an excavator wear assembly. The lock has a first member a key way located on an internal face of the first member. The lock also has a second member having a key located on an internal face of the second member such that the key is receivable within the keyway of the first member. Furthermore, the lock has a fastening member receivable within the first member and the second member to thereby releasably secure the first member to the second member.

11 Claims, 12 Drawing Sheets

LOCK FOR AN EXCAVATOR WEAR ASSEMBLY

CROSS REFERENCE

The present application is a National Stage entry from PCT Patent Application No. PCT/AU2009/001194 filed on 10 Sep. 2009, which claims priority to Australian Application 2008906380 filed on 10 Dec. 2008 the contents of each one incorporated herein by reference.

FIELD OF THE INVENTION

The invention relates to a lock for an excavator wear assembly. In particular, although not exclusively, the invention relates to a lock for releasably securing an excavator tooth to a nose of an excavator bucket or to an adaptor releasably secured to a nose of an excavator bucket.

BACKGROUND TO THE INVENTION

Excavator tooth assemblies mounted to the digging edge of excavator buckets and the like generally comprise a replaceable digging tooth, an adaptor body and an adaptor nose which is secured by welding or the like to the digging edge of a bucket or the like. The tooth generally has a socket-like recess at its rear end to receivably locate a front spigot portion of the adaptor nose and a removable locking pin is generally employed to releasably secure the tooth on the adaptor.

In use, excavator teeth are subjected to extensive load forces along a longitudinal axis of a tooth as well as in vertical and transverse directions. A snug fit is required between the digging point and the front portion of the adaptor and also between the adaptor socket and the nose spigot portion and their respective mounting pins to avoid premature wear between the components. As the various components wear, the locking pins can loosen thereby increasing the risk of loss of a digging point or an entire adaptor/tooth combination. This necessitates considerable downtime to replace the lost wear members and where items such as locking pins are not recovered, these can cause damage and/or further downtime in downstream operations such as ore crushing and the like.

The greatest loads experienced by excavator tooth assemblies are vertical loads which tend to generate large moment forces capable of rotating a tooth off the front of an adaptor and/or rotating the adaptor off the adaptor nose. In addition, twisting or "yaw" loads are frequently imposed on such tooth assemblies.

Despite many prior art attempts to improve the mounting of a wear member to a nose of an excavator, most of these proposals suffer from one or more deficiencies.

While generally satisfactory for their intended purpose, the prior art all suffer from one or more shortcomings or disadvantages in terms of inadequate resistance to rotation of a tooth off a nose or an adaptor under the influence of vertical loads applying a rotational moment to the tooth, a predisposition to premature wear, difficulties in retention of the teeth on noses or adaptors, inadequate locking systems and unduly complicated configurations giving rise to increased fabrication costs.

OBJECT OF THE INVENTION

It is an object of the invention to overcome or at least alleviate one or more of the above problems and/or provide the consumer with a useful or commercial choice.

DISCLOSURE OF THE INVENTION

In one form, although it need not be the only or indeed the broadest form, the invention resides in a lock for an excavator wear assembly, the lock comprising;
a first member having a keyway, the keyway being located on an internal face of the first member;
a second member having a key located on an internal face of the second member, the key adapted to be receivable within the keyway of the first member; and
a fastening member receivable within the first member and the second member to thereby releasably secure the first member to the second member.

An excavator wear assembly comprising:
a wear member having an upper and lower mounting aperture;
an adaptor having a mounting spigot and a mounting aperture extending therethrough;
a lock adapted to releasably secure the tooth to the adaptor, the lock having a first member locatable through the upper mounting aperture of the wear member and extending at least partially through the mounting aperture of the adaptor, and a second member locatable through the lower mounting aperture of the wear member and at least partially through the mounting aperture of the adaptor;
wherein the first member of the lock is releasably securable to the second member of the lock by a fastening member extending within the first member and the second member to thereby releasably secure the wear member on the mounting spigot of the adaptor.

Further features of the present invention will become apparent from the following detailed description.

BRIEF DESCRIPTION OF THE DRAWINGS

To assist in understanding the invention and to enable a person skilled in the art to put the invention into practical effect preferred embodiments of the invention will be described by way of example only with reference to the accompanying drawings, wherein.

DETAILED DESCRIPTION OF THE INVENTION

The lock for an excavator for an excavator wear assembly is described with reference to an excavator wear member in the form of a tooth releasably secured to an adaptor. The adaptor is in turn secured to a nose of an excavator bucket or the like. A skilled addressee will appreciate that the invention may be employed to releasably secure an adaptor to a nose or a tooth directly to a nose of an excavator bucket lip.

Figure 1A:
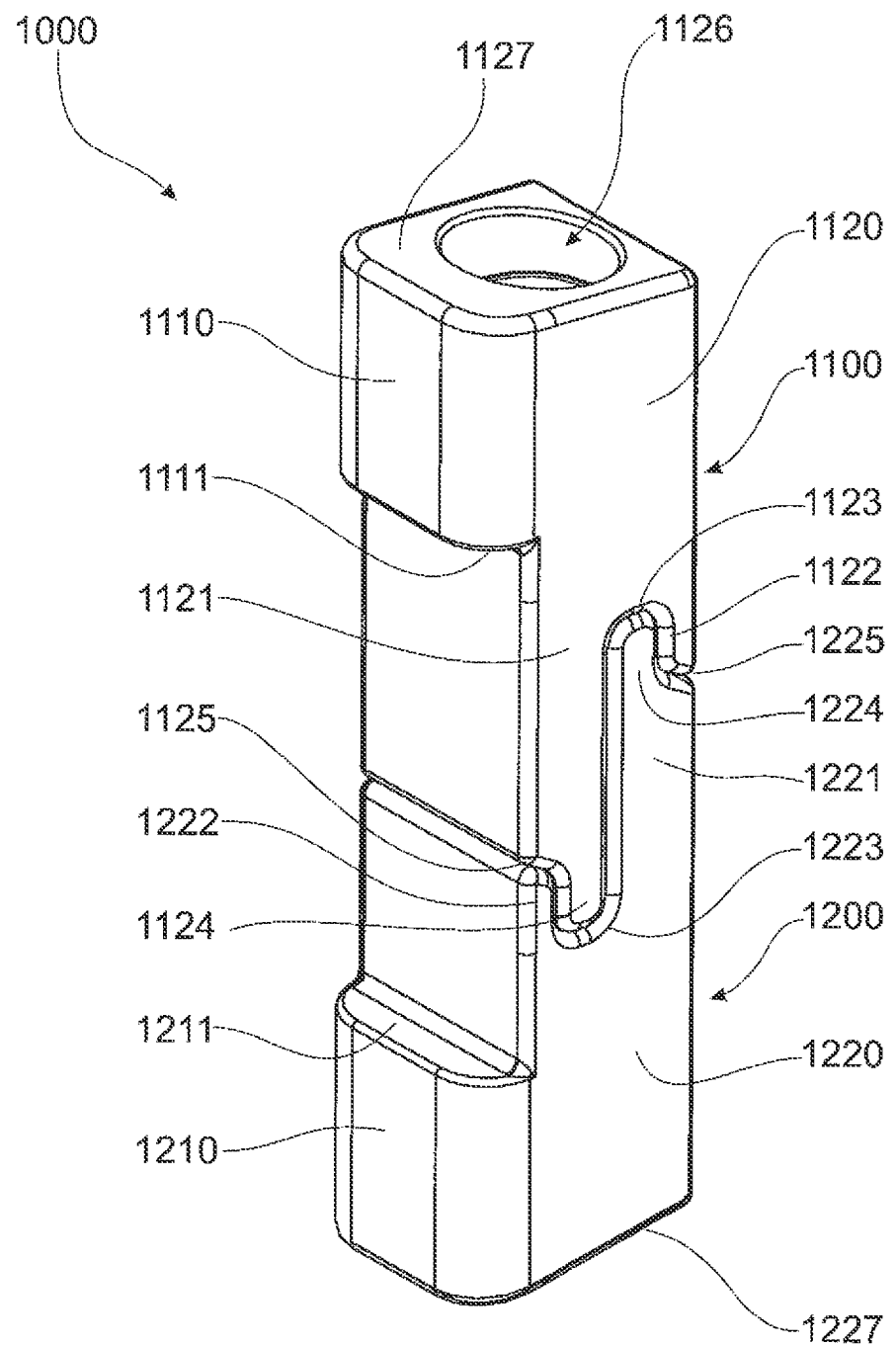
FIG. 1A shows a perspective view of a lock for an excavator wear assembly according to an embodiment of the invention.
Figure 1B:
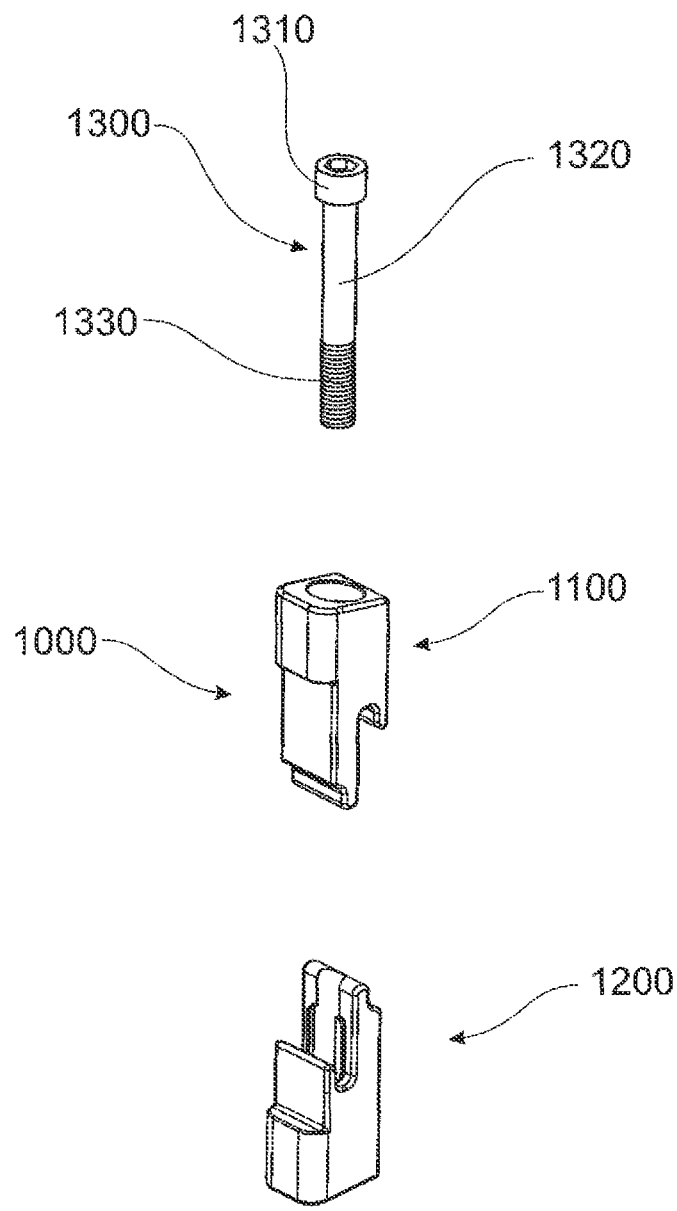
FIG. 1B shows an exploded perspective view of the lock shown in FIG. 1A.
Figure 1C:
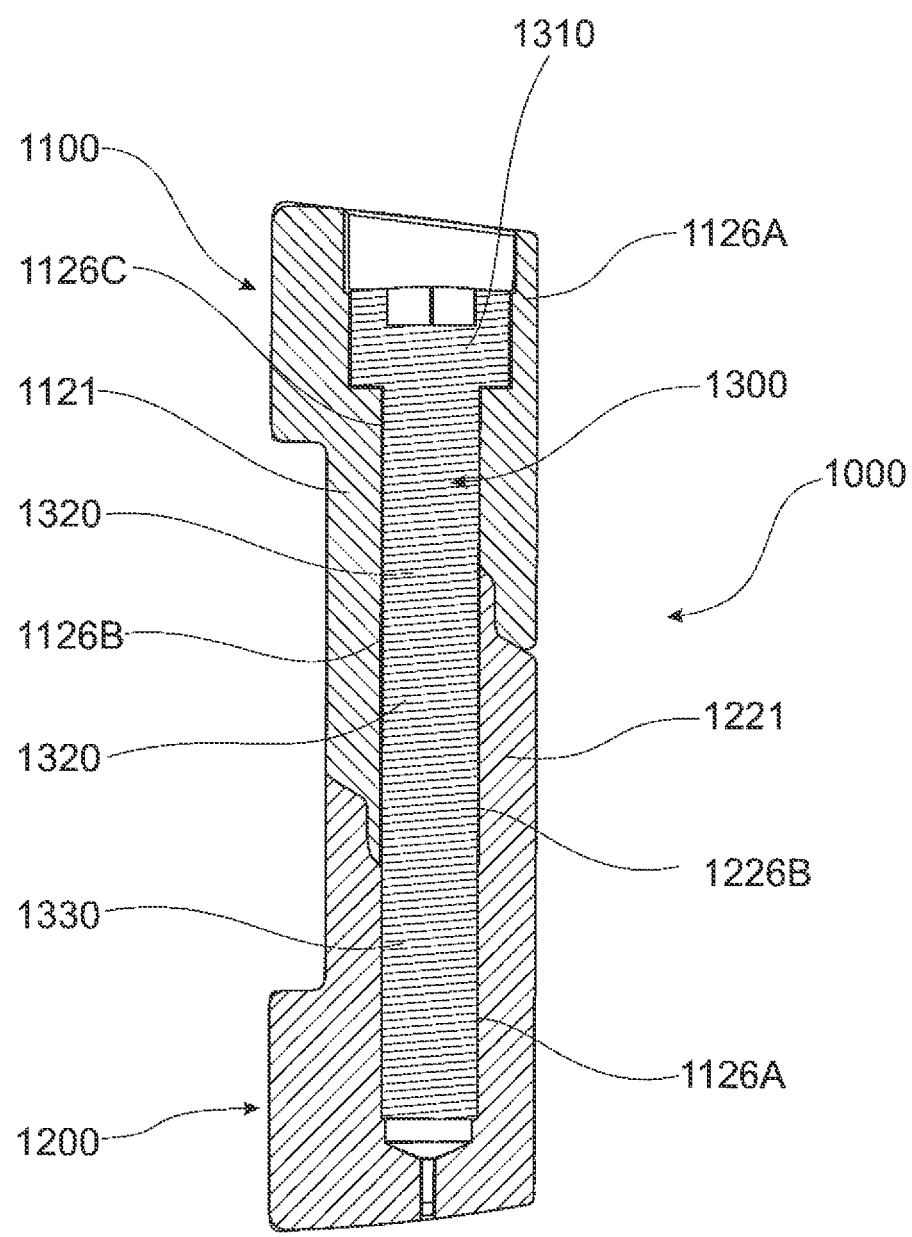
FIG. 1C shows a sectional side view of the lock shown in FIG. 1A.

FIG. 1A shows a perspective view of a lock 1000 for an excavator wear assembly according to an embodiment of the invention. FIG. 1B shows an exploded perspective view of lock 1000 and FIG. 1C shows a sectional side view of lock 1000.

Lock 1000 has a first member 1100, a second member 1200 and a fastening member, in the form of a bolt 1300 in the embodiment, receivable within both first member 1100 and second member 1200. First member 1100 is slidably securable to second member 1200 by way of fastening member in the form of bolt 1300 as will be discussed in greater detail below.

First member 1100 has a block portion 1110 and a stem portion 1120 extending from block portion 1110. Block portion 1110 has a locating face 1111 formed thereon as will be discussed in greater detail below.

Stem portion 1120 is formed from a first leg portion 1121 and a second leg portion 1122 forming a seat 1123 therebetween. First leg portion 1121 also has a finger 1124 extending from an outward extent thereof forming a seat 1125. Seat 1125 opens at an outer face of first member 1100.

First member 1100 also has a fastening aperture 1126 extending from an angled end face 1127 of first member 1100. Fastening aperture 1126 is formed from a recess 1126A, a bore 1126C and a valley 1126B extending from bore 1126C along an inner face of first leg portion 1121 as will be discussed in greater detail below.

Second member 1200 has a block portion 1210 and a stem portion 1220 extending from block portion 1210. Block portion 1210 has a locating face 1211 formed thereon as will be discussed in greater detail below.

Stem portion 1220 is formed from a first leg portion 1221 and a second leg portion 1222 forming a seat 1223 therebetween. First leg portion 1221 also has a finger 1224 extending from an outward extent thereof forming a seat 1225. Seat 1225 opens at an outer face of second member 1200.

Second member 1200 also has a blind fastening bore 1226 formed from a valley 1226B extending along an inner face of first leg portion 1221 and terminating at blind threaded end 1226A. Second member 1200 also has an angled end face 1227.

In the embodiment, fastening member 1300 is in the form of bolt 1300 having a head 1310, a shaft 1320 extending from head 1310. Shaft 1320 has a threaded portion 1330 at a lower extent thereof. Head 1310 has a recess 1311 on an outer face thereof to receive a driving end of power tool or the like.

Bolt 1300 slidably secures first member 1100 to second member 1200 as will be discussed in further detail below.

Figure 2A:
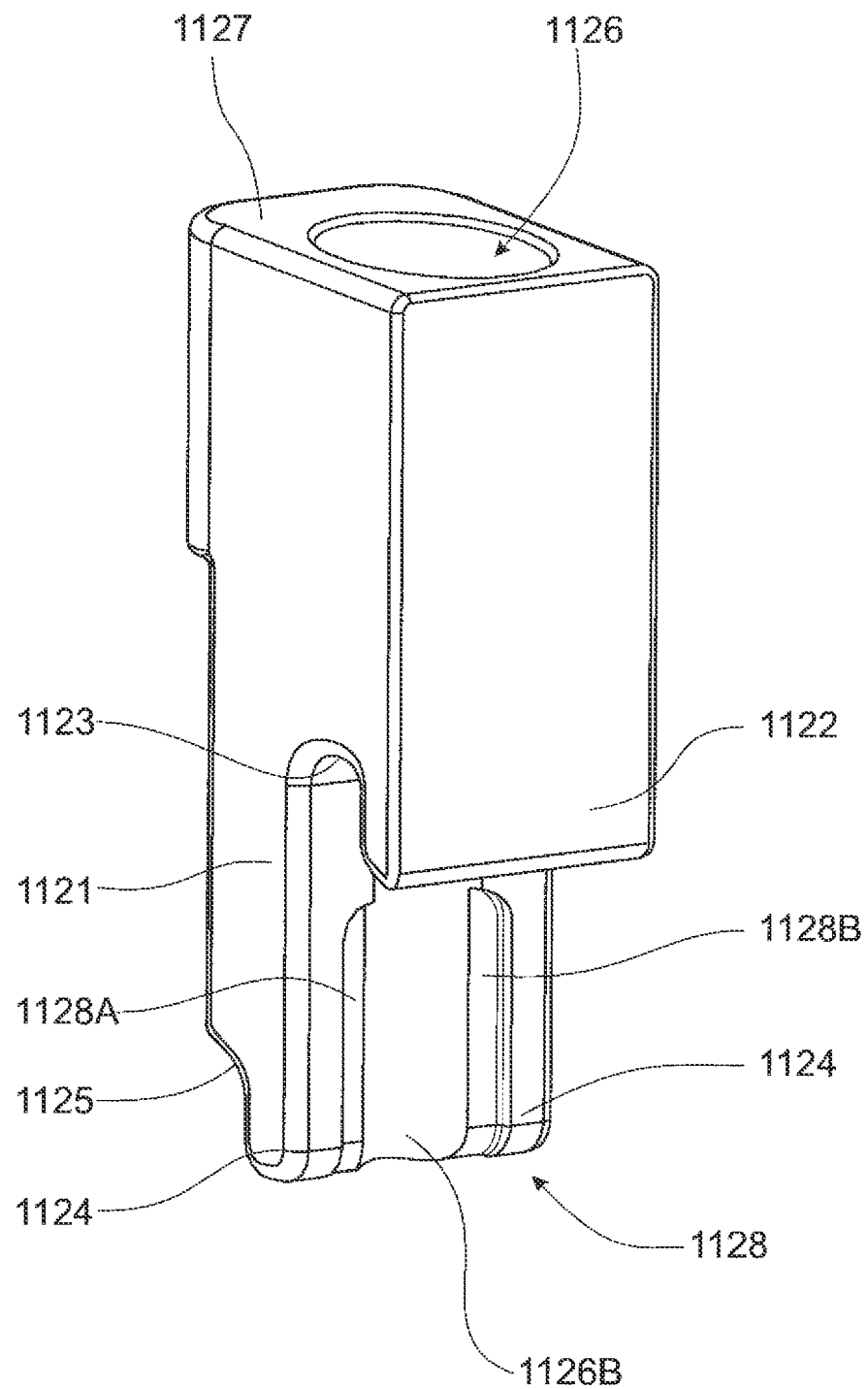
FIG. 2A shows a reverse perspective view of a first member of the lock shown in FIG. 1A.
Figure 2B:
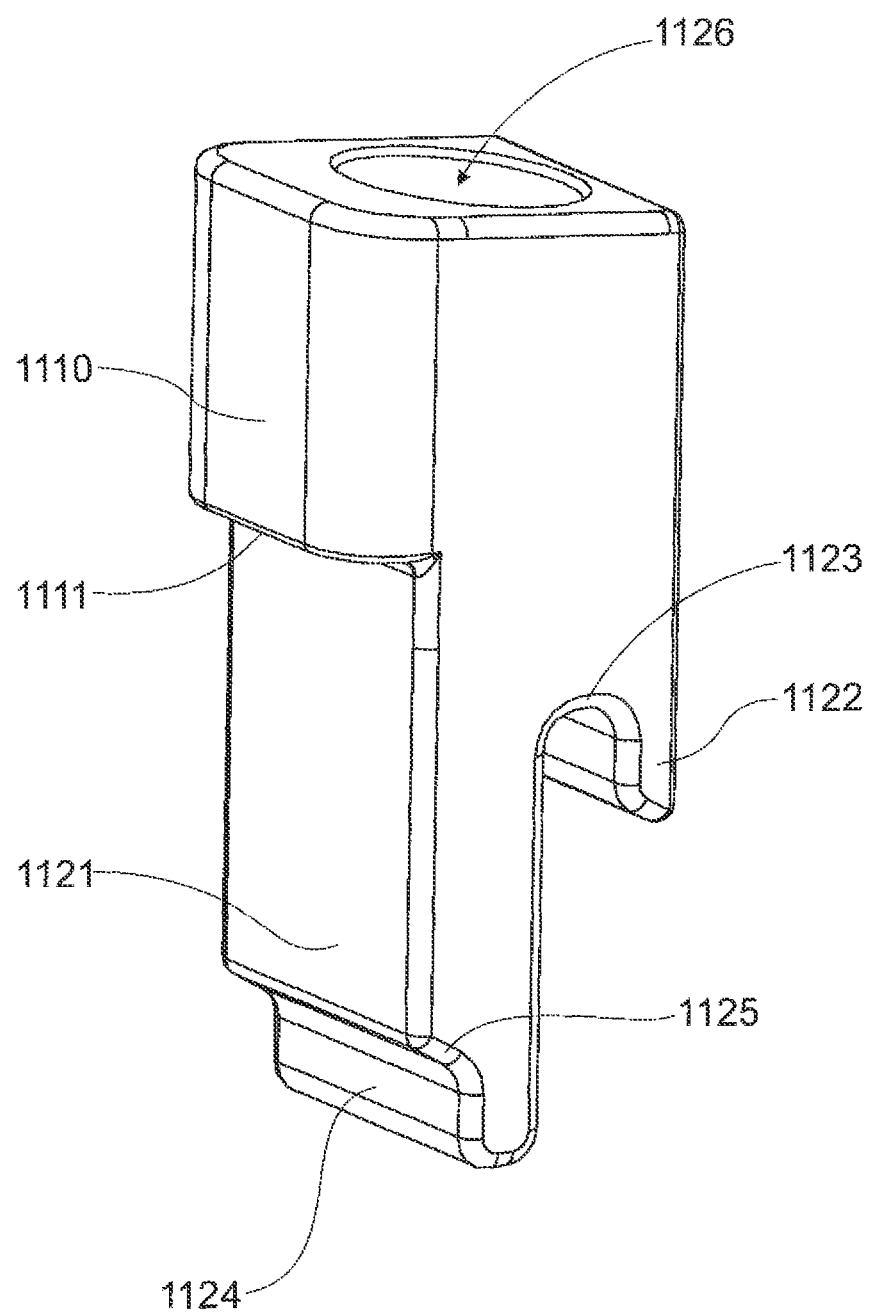
FIG. 2B shows a perspective view of the first member shown in FIG. 2A.
Figure 2C:
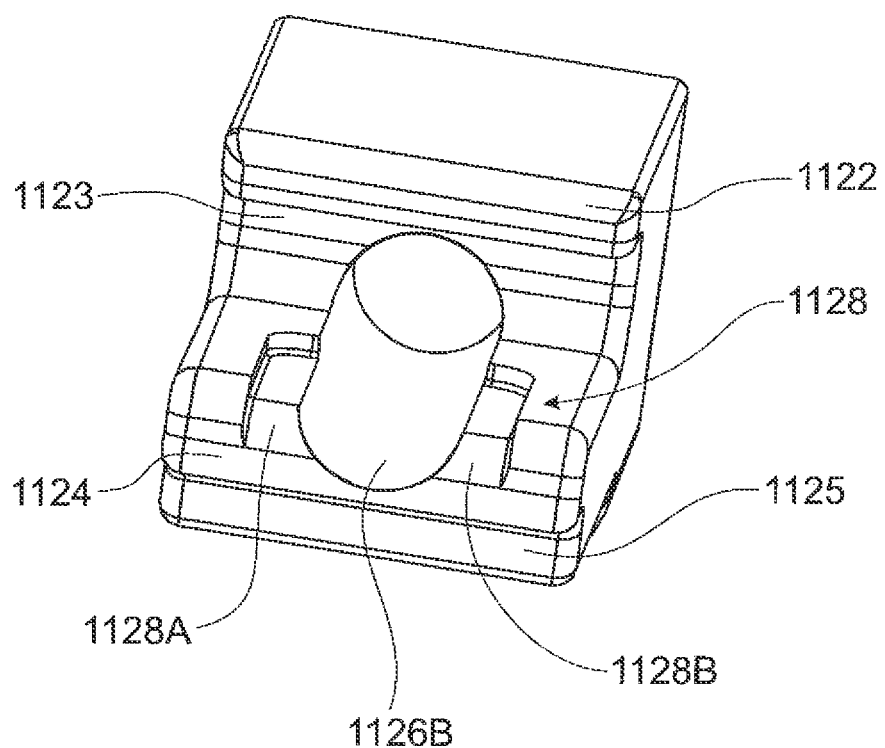
FIG. 2C shows an underside perspective view of the first member shown in FIG. 2A.

FIG. 2A shows a reverse perspective view of first member 1100 in greater detail. FIG. 2B shows a perspective view of first member 1100 in greater detail and FIG. 2C shows an underside perspective view of first member 1100.

As shown, a key way 1128 is formed on an inner face of first member 1100. In the embodiment, key way 1128 is formed from two key way portions 1128A and 1128B located on an inner face of first leg portion 1121. Each key way portion 1128A and 1128B is located on either side of valley 1126B and open on to valley 1226B.

Figure 3A:
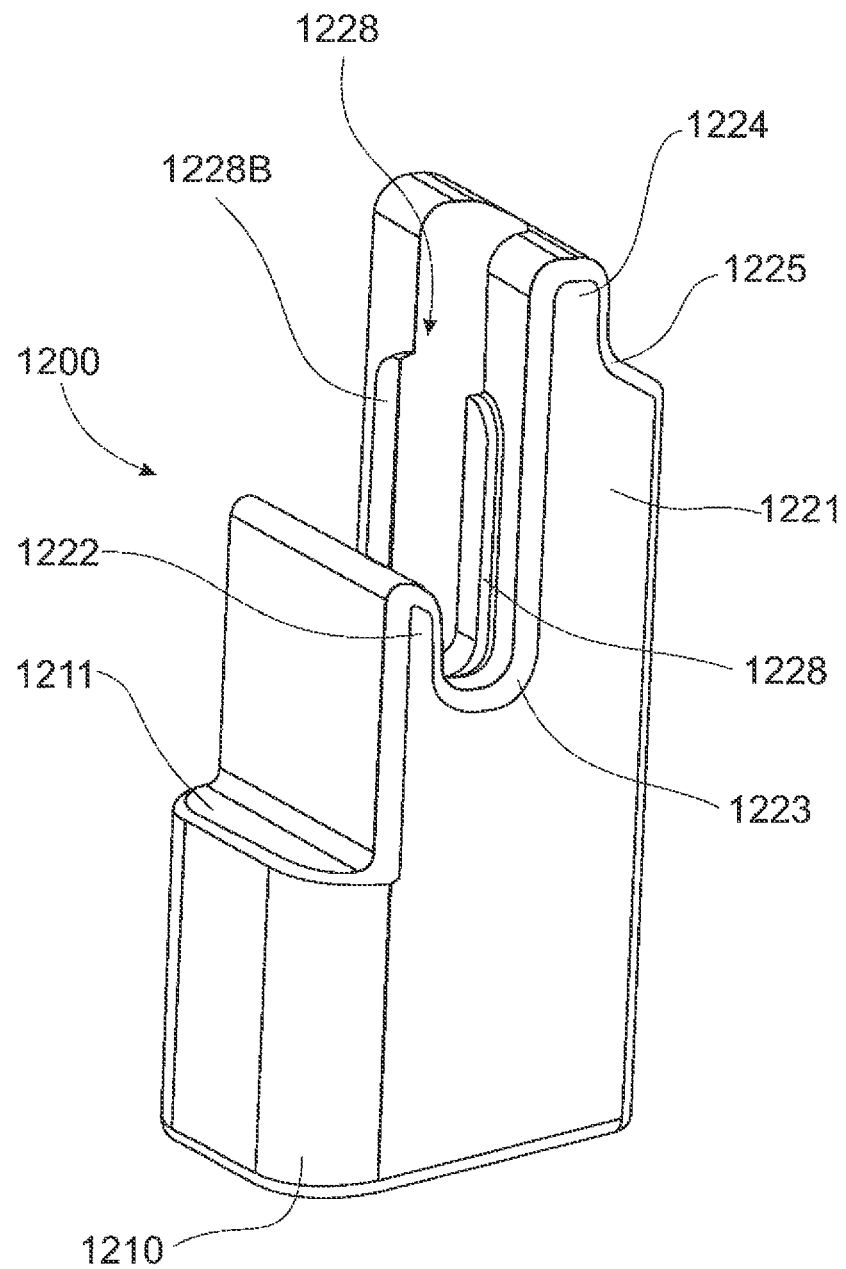
FIG. 3A shows a perspective view of a second member of the lock shown in FIG. 1A.
Figure 3B:
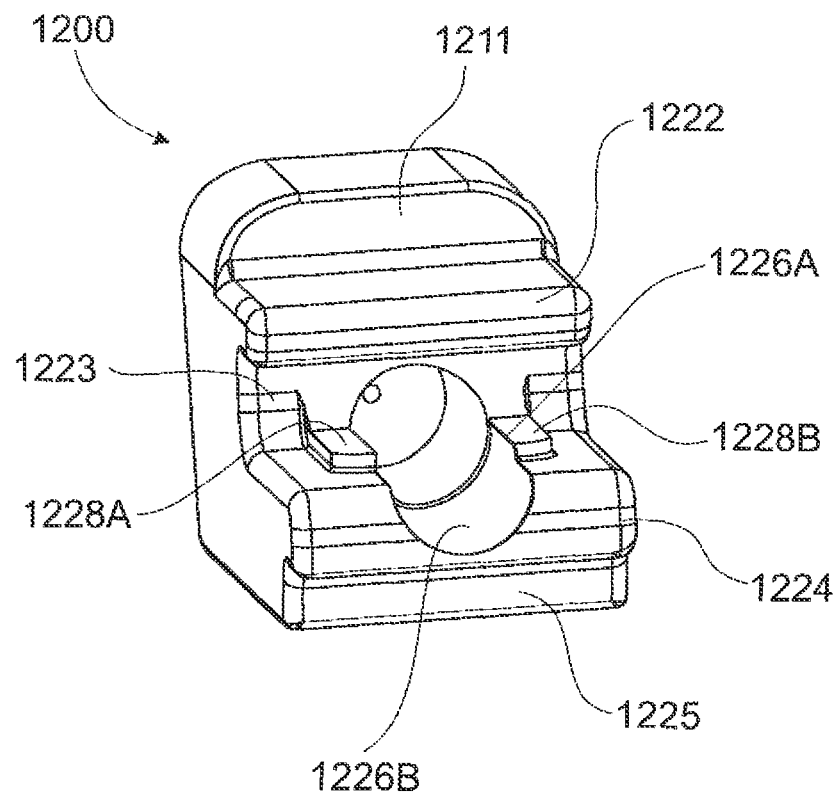
FIG. 3B shows a top side perspective view of the second member shown in FIG. 3A.

FIG. 3A shows a perspective view of second member 1200 in greater detail and FIG. 3B shows a top side perspective view of second member 1200.

As shown, a key 1228 is formed on an inner face of second member 1200. In the embodiment, key 1228 is formed from two key portions 1228A and 1228B located on an inner face of first leg portion 1221. Each key portion 1128A and 1128B is located on either side of valley 1226B.

In use, first member 1100 is slidably securable to second member 1200 by way of fastening member in the form of bolt 1300. With particular reference to FIG. 1A and FIG. 1C, first member 1100 is mounted upon second member 1200 such that finger 1124 of first leg portion 1121 is located within seat 1223 of second member 1200. In this configuration, second leg portion 1222 of second member 1200 is located within seat 1125 of first member 1100.

Similarly, finger 1224 of first leg portion 1221 is located within seat 1123 of first member 1100. In this configuration, second leg portion 1122 of first member 1100 is located within seat 1225 of second member 1200.

Furthermore, key 1228 of second member 1200 is slidably located within key way 1128 of first member. In the embodiment, key 1228A is located within key way 1128A and key 1228B is located within key way 1128B.

In this configuration, fastening aperture 1126 of first member 1100 aligns and corresponds with blind fastening bore 1226 of second member 1200 to form an aperture extending from angled upper face 1127 of first member 1100 and terminating at blind threaded end 1226A of blind fastening bore 1226.

Shaft 1320 of bolt 1300 is located within this aperture such that threaded portion 1330 of shaft 1320 is located within blind threaded end 1226A and shaft is located within valley 1126B and 1226B respectively. Bolt 1300 is then rotated to drive threaded portion 1330 of shaft 1310 within corresponding threaded blind threaded end 1226A of blind bore 1226 such that an underside of head 1310 is held firmly in abutment with an upper face of recess 1126A.

As such, first member 1100 is firmly secured to second member 1200.

Figure 4A:
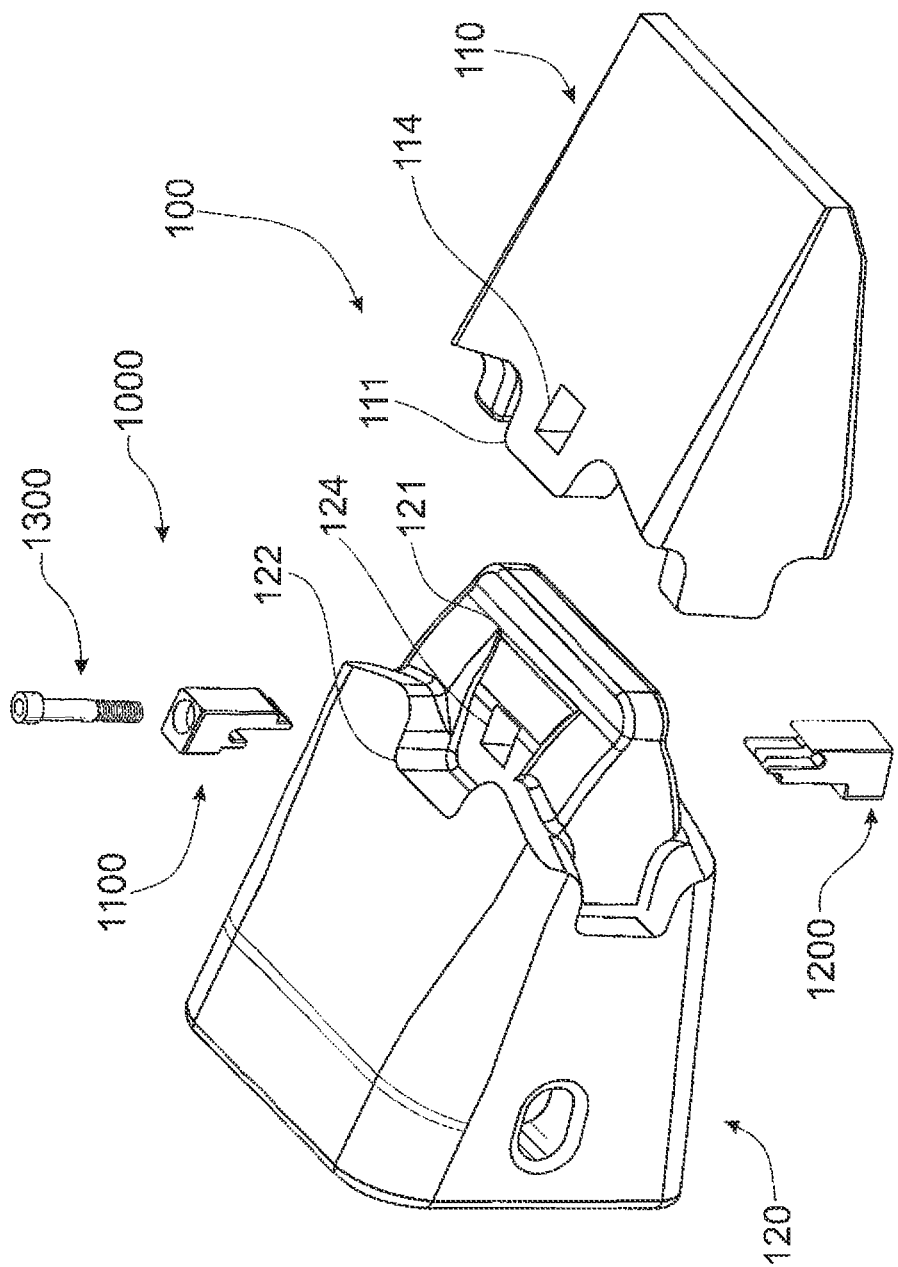
FIG. 4A shows an exploded perspective view of an excavator wear assembly having the lock shown in FIG. 1A.
Figure 4B:
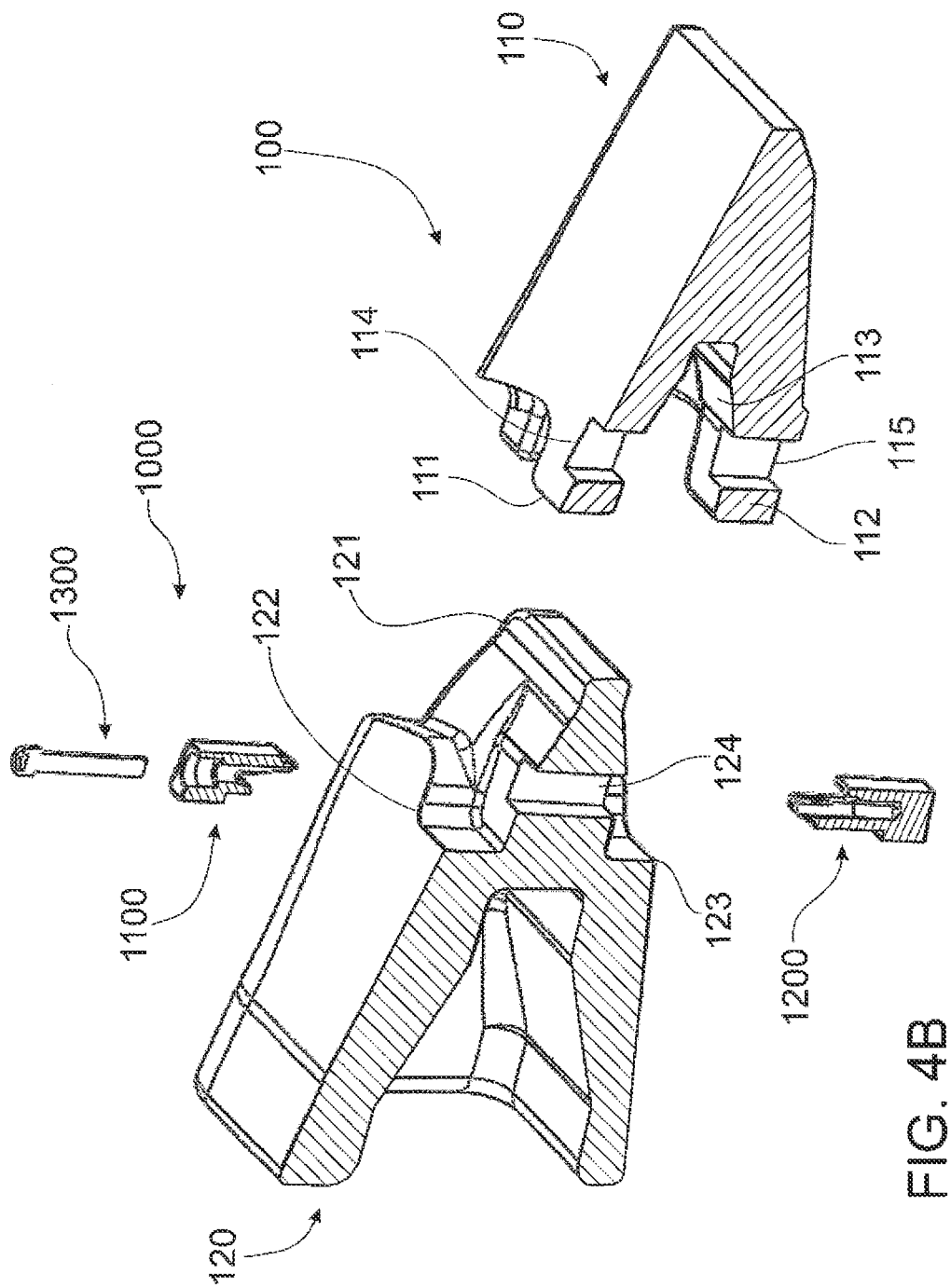
FIG. 4B shows an exploded sectional perspective view of the excavator wear assembly shown in FIG. 4A.

FIG. 4A shows an exploded perspective view of an excavator wear assembly 100 having the lock 1000 of the invention. In this application lock 100 is used to releasably secure a digging tooth 110 to an adaptor 120. FIG. 4B shows an exploded perspective sectional view of the excavator wear assembly 100.

Tooth 110 has an upper mounting projection 111 and a lower mounting projection 112 and a rearwardly facing socket 113. An upper mounting aperture 114 extends through upper mounting projection 111 and a lower mounting aperture 115 extends through lower mounting projection 112.

Adaptor 120 has a mounting spigot 121 receivable within rearwardly facing socket 113 of tooth 110. An upper mounting recess 122 and a lower mounting recess 123 are located rearwardly of mounting spigot 121 on an upper and lower face respectively thereof. Adaptor 120 further includes a mounting aperture 124 extending through mounting spigot 121.

Figure 5A:
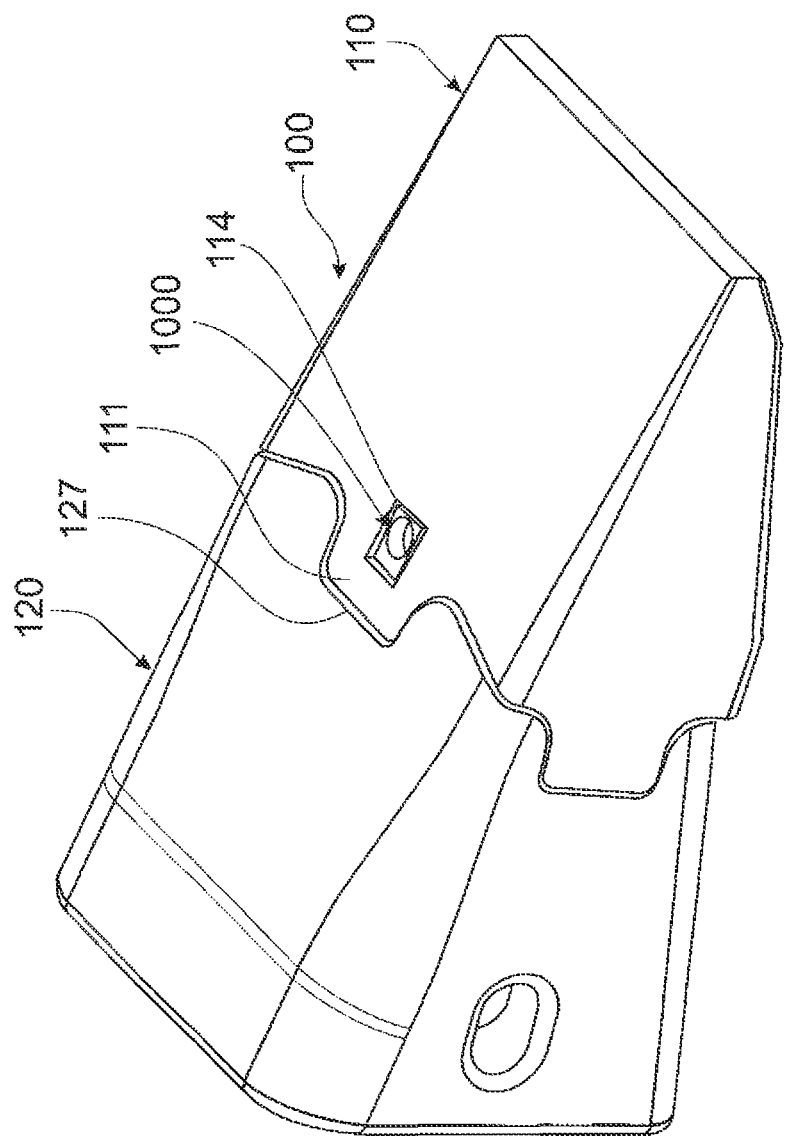
FIG. 5A shows a perspective view of the excavator wear assembly shown in FIG. 4A.
Figure 5B:
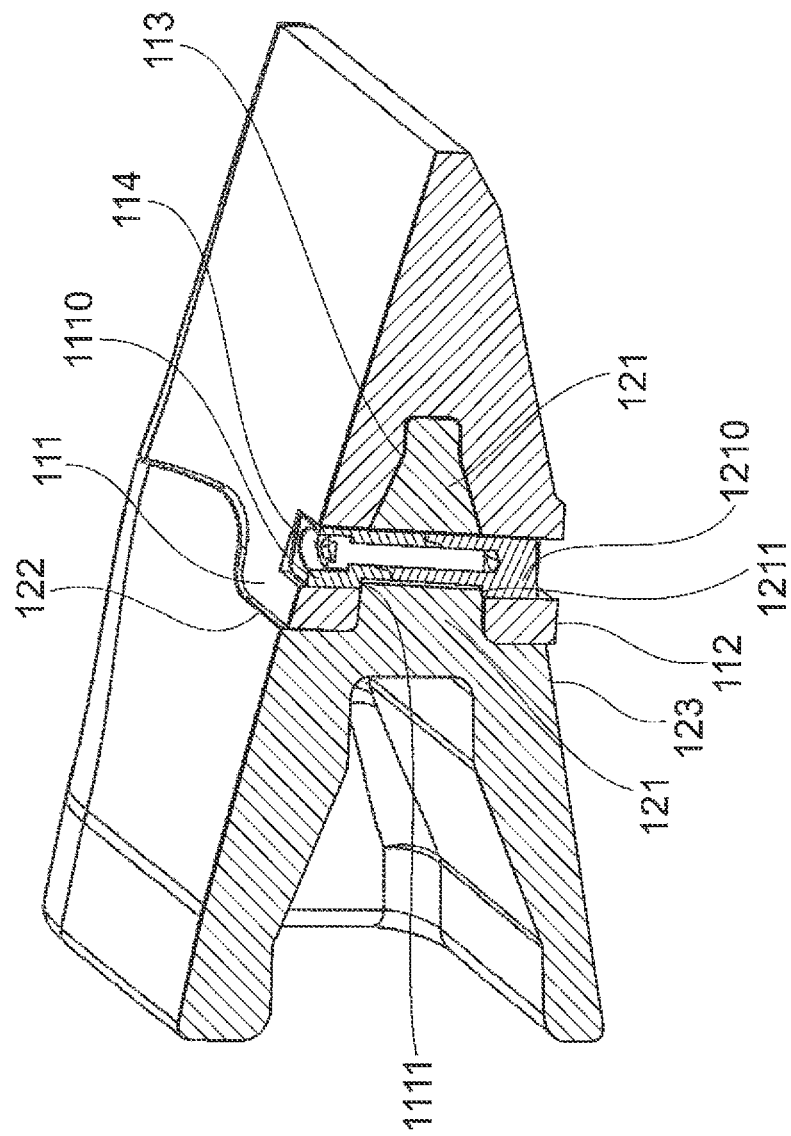
FIG. 5B shows a sectional perspective view of the excavator wear assembly shown in FIG. 4A.

FIG. 5A shows a perspective view of the excavator wear assembly 100 in an assembled position and shown FIG. 5B shows a sectional perspective view of the excavator wear assembly 100 in the assembled position.

First member 1100 is located though upper mounting aperture 114 of tooth 110 until locating face 1111 is located on an upper surface of mounting spigot 121 of adaptor 120 adjacent upper mounting recess 122 as shown. Bolt 1300 is then located through fastening recess 1126 of first member 1100.

Second member 1200 is then located though lower mounting aperture 115 of tooth 110. This causes shaft 1320 of bolt to locate within blind fastening bore 1226 of second member 1200. Bolt 1300 is then rotated as described previously causing second member 1200 to engage with first member 1100 as previously discussed. In this position locating face 1211 of second member is in firm abutment with a lower surface of mounting spigot 121 of adaptor 120 adjacent lower mounting recess 123 as shown.

In this position, lock 1000 releasably secures tooth 110 to adaptor 120.

As shown in FIGS. 4A, 4B, 5A and 5B, the lock 1000 has a reverse configuration from the embodiment shown previously in that the first member has a finger 1124 located on a side of lock 1000 distal block portion 1110 of first member 1100.

Throughout the specification the aim has been to describe the invention without limiting the invention to any one embodiment or specific collection of features. Persons skilled in the relevant art may realize variations from the specific embodiments that will nonetheless fall within the scope of the invention.

It will be appreciated that various other changes and modifications may be made to the embodiment described without departing from the spirit and scope of the invention.

The invention claimed is:

1. A lock for an excavator wear assembly, the lock comprising
    a first member having a first leg portion and a second leg portion and seat formed between the first leg portion and the second leg portion, the first leg portion of the first member having as inner face which faces the second leg portion of the first member, and a keyway located on the inner face of the first leg portion of the first member;
    a second member having a first leg portion and a second leg portion and seat formed between the first leg portion and the second leg portion, the first leg portion of the second member having an inner face which faces the second leg portion of the second member, and a key located on the inner face of the first leg portion of the second member, the key adapted to be receivable within the keyway of the first member; and
    a fastening member receivable within the first member and the second member to thereby releasably secure the first member to the second member.

2. The lock of claim 1, wherein the first member has a fastening aperture extending longitudinally therethrough.

3. The lock of claim 1, wherein the second member has a fastening bore extending longitudinally therethrough.

4. The lock of claim 3, wherein the fastening bore has a blind threaded end.

5. The lock of claim 1, wherein the first member has a fastening aperture extending longitudinally therethrough and the second member has a fastening bore extending therethrough such that, in use, the fastening member is receivable within the fastening aperture of the first member and the fastening bore of the second member to thereby releasably secure the first member to the second member.

6. The lock of claim 1, wherein each of the first member and the second member is formed from a block portion and a stem portion extending from the block portion.

7. The lock of claim 1, wherein the first member has a finger extending from the first leg portion, the finger adapted to be located within the seat of the second member.

8. The lock of claim 1, wherein the key is slidably locatable within the keyway.

9. The lock of claim 1, wherein the key is formed from two key portions located on an inner face of the second member and straddling a valley forming part of a fastening aperture.

10. The lock of claim 1, wherein the keyway is formed from two keyway portions located on an inner face of the first member and straddling a valley forming part of a fastening aperture, the key way portions opening on to the valley.

11. An excavator wear assembly comprising:
    a wear member having an upper and lower mounting aperture;
    an adaptor having a mounting spigot and a mounting aperture extending therethrough;
    a lock adapted to releasably secure the tooth to the adaptor, the lock having a first member locatable through the upper mounting aperture of the wear member and extending at least partially through the mounting aperture of the adaptor, and a second member locatable through the lower mounting aperture of the wear member and at least partially though the mounting aperture of the adaptor;
    wherein the first member of the lock is releasably securable to the second member of the lock by a fastening member extending within the first member and the second member to thereby releasably secure the wear member on the mounting spigot of the adaptor, wherein the first member of the lock has a first leg portion and a second leg portion and seat formed between the first leg portion and the second leg portion, the first leg portion of the first member having an inner face which faces the second leg portion of the first member, and a keyway located on the inner face first leg portion of the first member thereof and the second member of the lock has a first leg portion and a second leg portion and seat formed between the first leg portion and the second leg portion, the first leg portion of the second member having an inner face which faces the second leg portion of the second member, and a key located on the inner face of the first leg portion of the second member such that the key is received within the keyway when the first member of the lock is releasably secured to the second member of the lock by the fastening member.

* * * * *